(12) United States Patent
Yamakawa et al.

(10) Patent No.: US 6,767,196 B2
(45) Date of Patent: Jul. 27, 2004

(54) MANUFACTURING APPARATUS FOR PRODUCING A MULTI-FIBER OPTICAL FERRULE

(75) Inventors: Jun Yamakawa, Tokyo (JP); Masahiro Hirao, Tokyo (JP); Yasushi Kihara, Tokyo (JP); Takashi Shigematsu, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 171 days.

(21) Appl. No.: 10/055,023

(22) Filed: Jan. 22, 2002

(65) Prior Publication Data

US 2002/0146480 A1 Oct. 10, 2002

(30) Foreign Application Priority Data

Apr. 6, 2001 (JP) .......................................... 2001-109095

(51) Int. Cl.[7] .............................................. B29C 45/16
(52) U.S. Cl. .......................... 425/117; 425/468; 425/577
(58) Field of Search ................................. 425/117, 468, 425/577

(56) References Cited

U.S. PATENT DOCUMENTS

| | | | | |
|---|---|---|---|---|
| 5,269,998 A | * | 12/1993 | Takagi et al. | 425/577 |
| 5,786,002 A | * | 7/1998 | Dean et al. | 425/577 |
| 6,074,577 A | * | 6/2000 | Katsura et al. | 425/468 |
| 6,213,750 B1 | * | 4/2001 | Dean et al. | 425/577 |

FOREIGN PATENT DOCUMENTS

JP          9-318844          12/1997

* cited by examiner

*Primary Examiner*—Tim Heitbrink
(74) *Attorney, Agent, or Firm*—Oblon, Spivak, McClelland, Maier & Neustadt, P.C.

(57) ABSTRACT

A manufacturing apparatus for multi-fiber optical ferrule includes a spacer whose hardness is equivalent to or higher than the hardness of pins for forming fiber holes. Further, corner portions with respect to the arrangement direction of the pins for forming fiber holes of the spacer are formed as inclined surfaces or rounded surfaces.

3 Claims, 6 Drawing Sheets

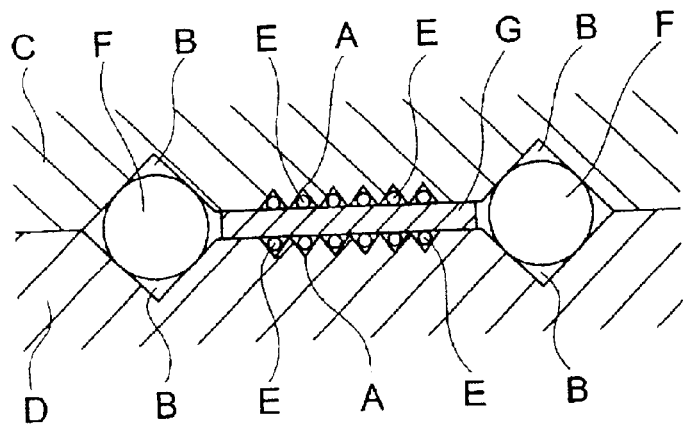
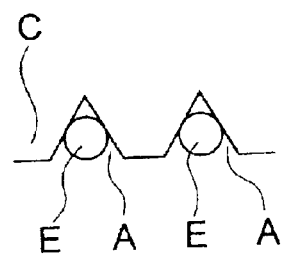
FIG. 6A  FIG. 6B
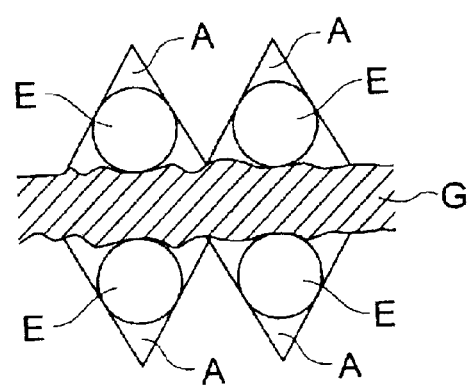
FIG. 7

MANUFACTURING APPARATUS FOR PRODUCING A MULTI-FIBER OPTICAL FERRULE

BACKGROUND OF THE INVENTION

Field of the Invention

The present invention relates to a manufacturing apparatus for multi-fiber optical ferrule used in optical communication and, in particular, to a manufacturing apparatus suitable for manufacturing a multi-fiber optical ferrule having optical fiber holes in two or more rows.

Multi-fiber optical ferrules for accommodating a large number of fibers are of a plurality of types, including a single-row type in which fiber holes are formed in a row, and a multi-row type in which fiber holes are formed in two or more rows. FIG. 4 shows a multi-fiber optical ferrule in which fiber holes J are formed in two rows, and a guide hole K is formed on either outer side of the rows of fiber holes J.

As shown in FIGS. 6A and 6B, when manufacturing a two-row-type multi-fiber optical ferrule as shown in FIG. 4, an upper mold C and a lower mold D are conventionally prepared, each having V-grooves A for fiber holes and V-grooves B for guide holes. Pins for forming fiber holes E are placed in the V-grooves A for fiber holes, and pins for forming guide holes F are placed in the V-grooves B for guide holes. A rectangular spacer G is placed between the pins for forming fiber holes E, F and, in this condition, closing (butting) is effected with two or more molds, and resin is poured into a cavity formed by the molds to thereby manufacture a multi-fiber optical ferrule. However, there can be involved a variation in machining accuracy regarding the positions, configuration, depth, etc. of the V-grooves A for fiber holes and the V-grooves B for guide holes in the molds C and D. In particular, there can be a variation in the positions of the V-grooves A for fiber holes in the direction of the arrangement thereof. Thus, the multi-fiber optical ferrule formed by the molds C and D has a problem of the accuracy of the fiber holes J and the guide holes K (FIG. 4). To solve this problem, there has been conventionally proposed a method according to which the hardness of the material of the spacer G is lower than the hardness of the material of the pins for forming fiber holes E.

In the conventional technique, the hardness of the material of the spacer is lower than the hardness of the material of the pins for forming fiber holes E, so that the spacer G is likely to undergo deformation as shown in FIG. 7 as a result of the pins for forming fiber holes E being pressed against the spacer G every time closing is effected for molding. This deformation is aggravated as the molding is repeated, with the result that the positions of the fiber holes J and the guide holes K (FIG. 4) are subject to deviation.

SUMMARY OF THE INVENTION

A manufacturing apparatus for multi-fiber optical ferrule according to the present invention is of the type which includes two or more molds having fitting groove for an optical fiber in which pins for forming fiber holes can be placed and fitting groove for guide holes in which pins for forming guide holes can be placed, the pins for forming fiber holes being placed in the fitting groove for an optical fiber, the pins for forming guide holes being placed in the fitting groove for guide holes, a spacer in the form of a rectangular parallelepiped being placed between the pins for forming fiber holes, closing being effected with the two or more molds, and resin is poured into a cavity formed inside the molds to thereby manufacture a multi-fiber optical ferrule having two or more rows of optical fiber holes, in which the hardness of the spacer is equivalent to or higher than the hardness of the pins for forming fiber holes. Corner portions with respect to the arrangement direction of the pins for forming fiber holes of the spacer are formed as rectilinear inclined surfaces or rounded surfaces.

BRIEF DESCRIPTION OF THE DRAWINGS

FIGS. 6A and 6B are partial front views showing an example of a conventional two-row type manufacturing apparatus for multi-fiber optical ferrule; and FIG. 7 is a diagram illustrating how a spacer in a conventional two-row type manufacturing apparatus for multi-fiber optical ferrule undergoes deformation.

DETAILED DESCRIPTION (Embodiment 1)

A manufacturing apparatus for multi-fiber optical ferrule according to an embodiment of the present invention will now be described with reference to FIGS. 1 through 3. The apparatus of this embodiment manufactures a multi-fiber optical ferrule having two rows of optical fiber holes.

This manufacturing apparatus for multi-fiber optical ferrule comprises upper and lower molds 1 and 2, a spacer 3 arranged between the molds 1 and 2, a large number of pins for forming fiber holes 4, and pins for forming guide holes 5.

Figure 1:
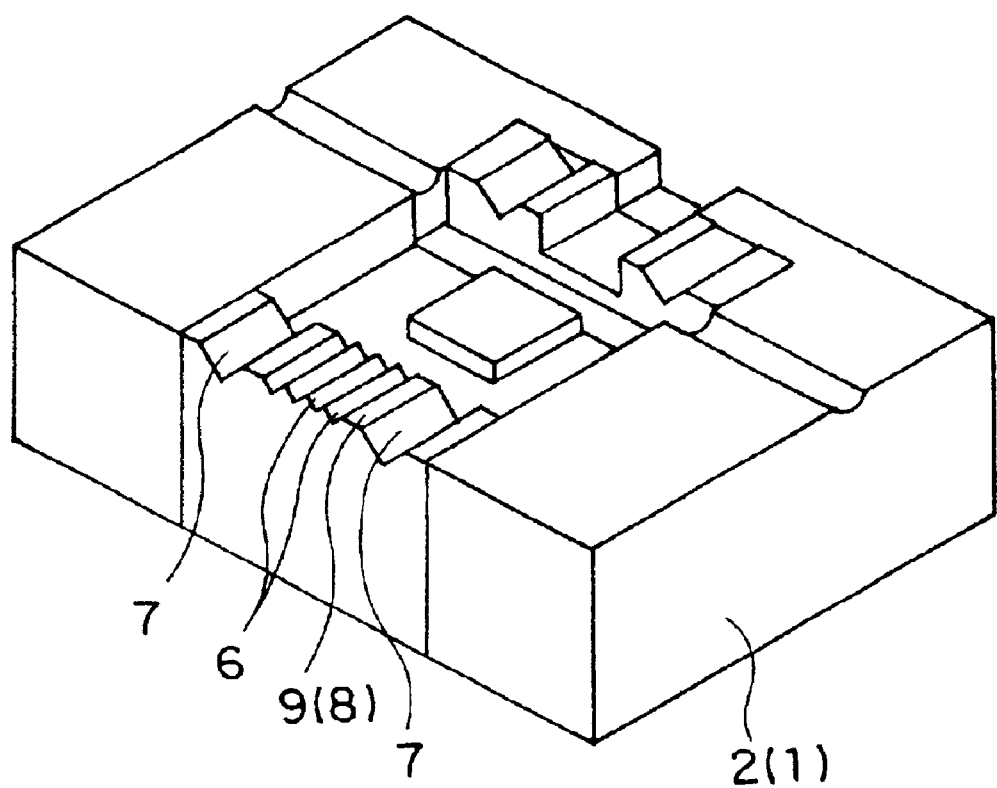
FIG. 1 is a perspective view showing an example of the lower mold of a manufacturing apparatus for multi-fiber optical ferrule according to the present invention.
Figure 2A:
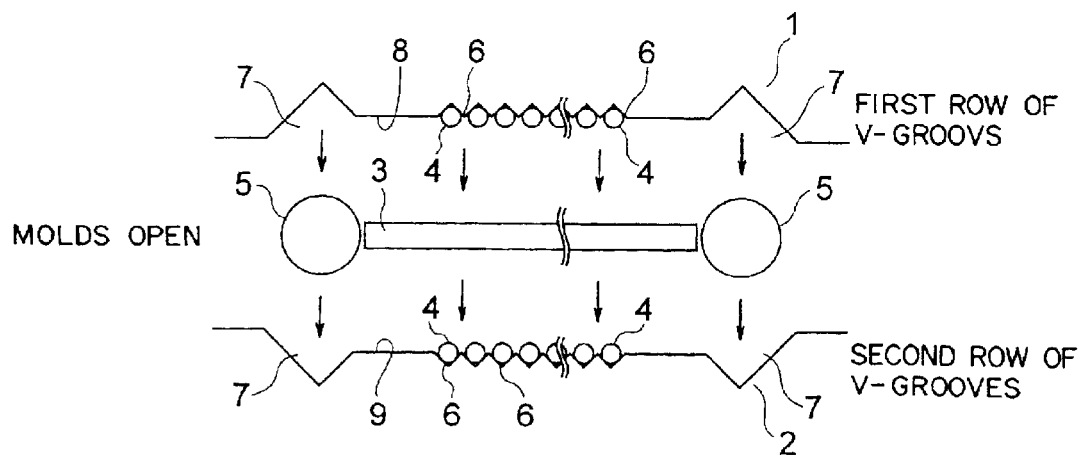
FIG. 2A is a partial front view showing an example of a manufacturing apparatus for multi-fiber optical ferrule according to the present invention.
Figure 2B:
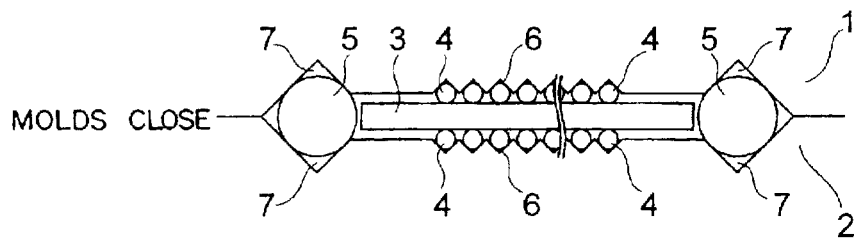
FIG. 2B is a partial front view showing the manufacturing apparatus for multi-fiber optical ferrule in the state in which closing is being performed.

In the example of the molds 1 and 2 shown in FIGS. 1, 2A, and 2B, a large number of fitting grooves for optical fibers 6 are formed in a row in the central portion with respect to the width direction, and a large number of pins for forming fiber holes 4 can be placed there in a row. On either outer side of the fitting groove for an optical fiber 6, there is formed a fitting groove for guide holes 7 in which a pin for forming guide holes 5 can be placed. The fitting groove for an optical fiber 6 and the fitting groove for guide holes 7 are all formed as V-shaped grooves in the inner surfaces 8 and 9 of the molds 1 and 2. When, as shown in FIG. 2B, the inner surfaces 8 and 9 of the molds 1 and 2 are caused to abut each other, the fitting grooves 6 and the fitting grooves 7 are respectively opposed to each other to define rhombic insertion holes. It is also possible for the fitting groove for an optical fiber 6 and the fitting groove for guide holes 7 to be of a configuration other than the V-shape. For example, they may be U-shaped grooves whose width is gradually diminished in the depth direction from the inner surfaces 8 and 9 or trapezoidal grooves.

As in the prior art, the molds 1 and 2, the pins for forming fiber holes 4, and the pins for forming guide holes 5 are formed of metal.

Figure 3A:
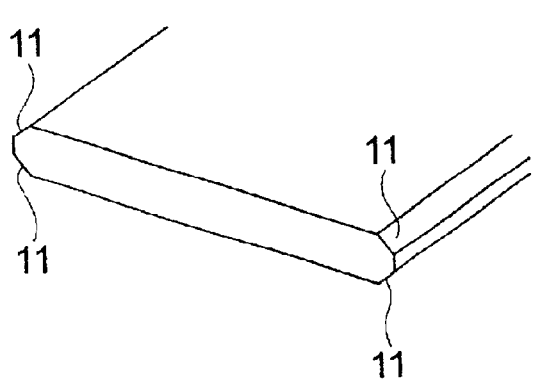
FIGS. 3A and 3B are partial perspective views showing variations of a spacer in a manufacturing apparatus for multi-fiber optical ferrule according to the present invention.
Figure 3B:
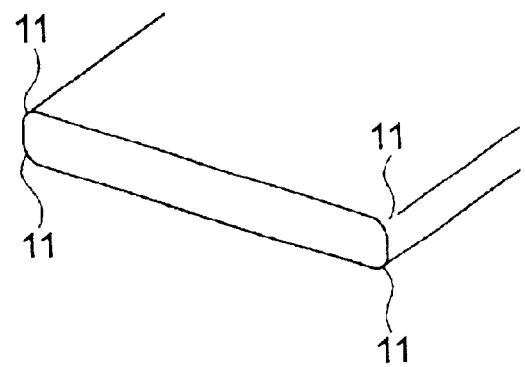
Figure 4:
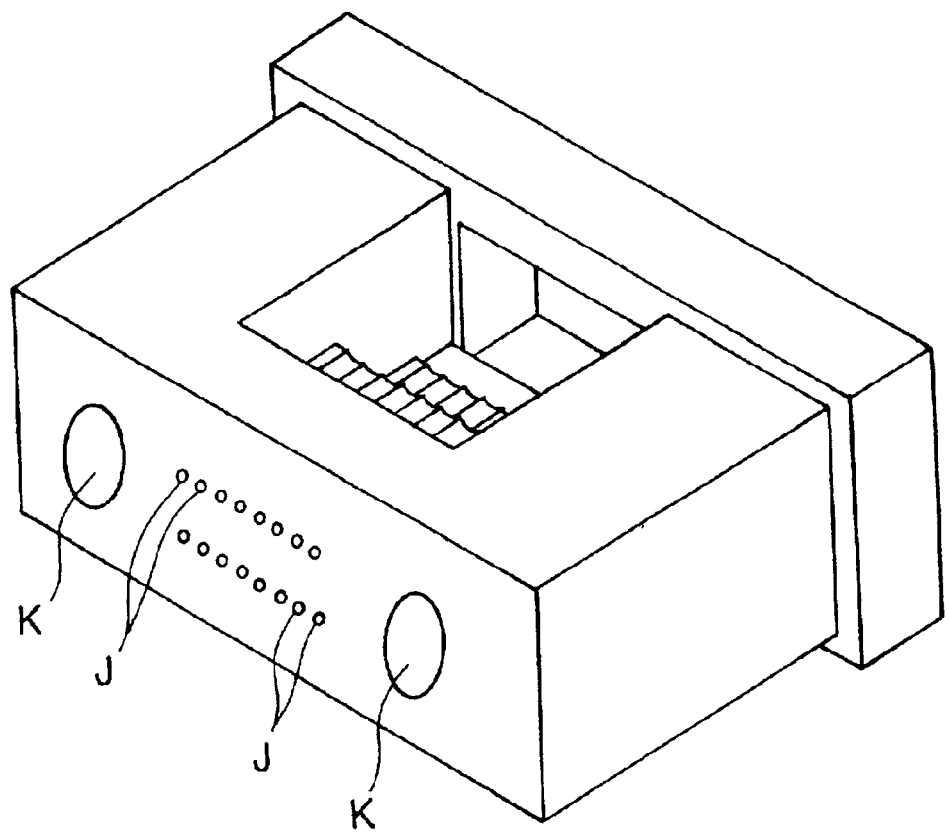
FIG. 4 is a perspective view showing an example of a two-row type multi-fiber optical ferrule.

The above-mentioned spacer 3 is in the form of a thick plate-like rectangular parallelepiped (having a thickness, for example, of 0.375 mm). Its four corners 11 with respect to the direction in which the pins for forming fiber holes 5 are arranged are formed as linear inclined surfaces as shown in FIG. 3A or arcuate (rounded) surfaces as shown in FIG. 3B. These inclined surfaces or the rounded surfaces can be formed simultaneously with the production of the spacer 3 or separately after the production thereof by beveling.

When, as described above, linear inclined surfaces or arcuate (rounded) surfaces are formed in the four corners 11 of the spacer 3, the air in the molds can be effectively allowed to escape at the time of molding, making it possible to prevent generation of voids, welds or the like at the time of the production of a multi-fiber optical ferrule. The hardness of the spacer 3 is equivalent to or higher than the hardness of the pins for forming fiber holes 4. Examples of a possible combination of materials providing such a hardness relationship are given below.

Spacer Material  Material of Pin for Forming Fiber Holes

Combination 1 cemented carbide cemented carbide
Combination 2 super-hard metal SKH An example of the process for manufacturing a multi-fiber optical ferrule by using the manufacturing apparatus for multi-fiber optical ferrule of the present invention is as follows.

(1) The pins for forming fiber holes 4 for the lower stage are placed in the fitting groove for an optical fiber 6 of the lower mold 2, and the pins for forming guide holes 5 are placed in the fitting groove for guide holes 7 of the mold 2.

(2) The spacer 3 is placed on the pins for forming fiber holes 4.

(3) The pins for forming fiber holes 4 for the upper stage are placed on the spacer 3.

(4) The upper mold 1 is placed from above on the pins for forming fiber holes 4 for the upper stage such that the fitting groove for an optical fiber 6 of the mold 1 are positioned over the pins for forming fiber holes 4 for the upper stage and that the V-shaped fitting grooves for guide holes 7 of the mold 1 are positioned over the pins for forming guide holes 5, and, in this condition, closing is effected.

(5) Resin is poured into the cavity defined by the molds 1 and 2 in closing engagement to thereby manufacture a multi-fiber optical ferrule.

Figure 5A:
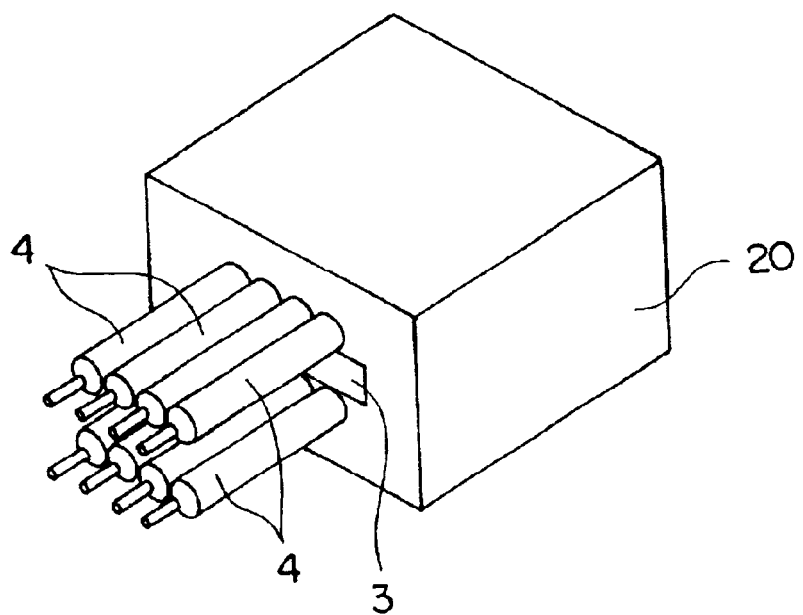
FIG. 5A is a perspective view showing another example of a spacer in a conventional two-row type manufacturing apparatus for multi-fiber optical ferrule according to the present invention.
Figure 5B:
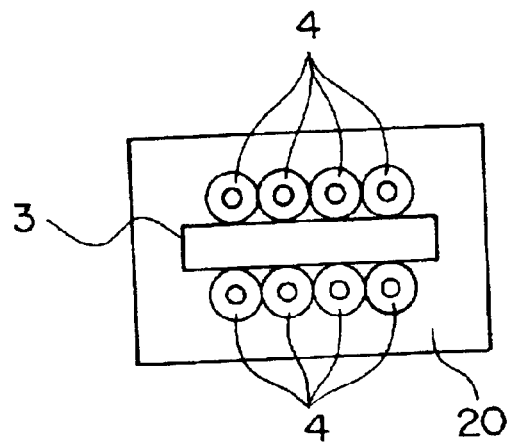
FIG. 5B is a front view thereof.

As shown in FIGS. 5A and 5B, in accordance with the present invention, it is also possible to manufacture an optical ferrule by using a holder 20 in which a large number of pins for forming fiber holes 4 are held in two rows with the spacer 3 being placed therebetween. It is also possible to manufacture a multi-fiber optical ferrule by using a holder in which a large number of pins for forming fiber holes are held in two rows.

The following is an example of a process for manufacturing a multi-fiber optical ferrule by means of a manufacturing apparatus for multi-fiber optical ferrules using this holder 20.

(1) The holder 20 is placed in the lower mold 2, and the pins for forming fiber holes 4 for the lower stage are placed in the fitting groove for an optical fiber 6 of the mold 2, the pins for forming guide holes 5 being placed in the fitting groove for guide holes 7 of the mold 2.

(2) The spacer 3 is placed between the pins for forming fiber holes 4 for the upper stage and the pins for forming fiber holes 4 for the lower stage.

(3) The upper mold 1 is placed from above on the pins for forming fiber holes 4 for the upper stage such that the fitting grooves for optical fibers 6 of the mold 1 are positioned over the pins for forming fiber holes 4 for the upper stage and that the fitting grooves for guide holes 7 of the mold 1 are positioned over the pins for forming guide holes 5, and, in this condition, closing is effected.

(4) Resin is poured into the cavity defined by the molds 1 and 2 in closing engagement to thereby manufacture a multi-fiber optical ferrule.

The number of rows of the pins for forming fiber holes 4 held in the holder 20 is not restricted to two, as long as two or more rows of these are formed.

The manufacturing apparatus for multi-fiber optical ferrule of the first aspect of the present invention, in which the hardness of the spacer is equivalent to or higher than the hardness of the pins for forming fiber holes, provides the following advantages.

(1) If the pins for forming fiber holes are pressed against the spacer every time closing is effected, the spacer does not undergo deformation, and there is no deviation regarding the positions of the molded fiber holes and guide holes.

(2) If there is positional deviation in the fitting groove for an optical fiber and the fitting groove for guide holes, the pressure at the time of closing is absorbed by elastic deformation of the pins for forming fiber holes placed in the fitting groove for an optical fiber, so that no excessive pressure is applied to the spacer or the pins for forming fiber holes. Thus, the manufacturing apparatus is little subject to damage, and it is possible to manufacture a larger number of multi-fiber optical ferrules by means of the dies. As a result, a reduction is achieved in terms of production cost per multi-fiber optical ferrule.

The manufacturing apparatus for multi-fiber optical ferrule according to the second aspect of the present invention, in which the corner portions with respect to the arrangement direction of the fitting groove for an optical fiber of the spacer are beveled to form inclined surfaces or rounded surfaces, provides the following advantages.

(1) The putting of the mold on the spacer is facilitated.

(2) When placing the mold from above, the spacer undergoes no positional deviation, whereby it is possible to achieve a satisfactory accuracy in spacer positioning.

In the manufacturing apparatus for multi-fiber optical ferrule according to the third aspect of the present invention, the hardness of the spacer is equivalent to or higher than the hardness of the pins for forming fiber holes, and the corner portions with respect to the arrangement direction of the V-grooves for fiber holes of the spacer are beveled to form inclined surfaces or rounded surfaces, whereby it is possible to achieve the advantages of both the first and second aspects of the invention.

What is claimed is:

1. A manufacturing apparatus for multi-fiber optical ferrule which includes two or more molds having fitting grooves for an optical fiber in which pins for forming fiber holes can be placed and fitting grooves for guide holes in which pins for forming guide holes can be placed, the pins for forming fiber holes being placed in the fitting groove for an optical fiber, the pins for forming guide holes being placed in the fitting groove for guide holes, a spacer in the form of a rectangular parallelepiped being placed between the pins for forming fiber holes, closing being effected with the two or more molds, resin being poured into the molds to thereby manufacture a multi-fiber optical ferrule having two or more rows of fiber holes, wherein the hardness of the spacer is equivalent to or higher than the hardness of the pins for forming fiber holes.

2. A manufacturing apparatus for multi-fiber optical ferrule which includes two or more molds having fitting grooves for an optical fiber in which pins for forming fiber holes can be placed and fitting grooves for guide holes in which pins for forming guide holes can be placed, the pins for forming fiber holes being placed in the fitting groove for an optical fiber, the pins for forming guide holes being placed in the fitting groove for guide holes, a spacer in the form of a rectangular parallelepiped being placed between the pins for forming fiber holes, closing being effected with the two or more dies, resin being poured into the molds to thereby manufacture a multi-fiber optical ferrule having two or more rows of optical fiber holes, wherein corner portions with respect to the arrangement direction of the pins for forming fiber holes of the spacer are formed as inclined surfaces or rounded surfaces.

3. A manufacturing apparatus for multi-fiber optical ferrule according to claim 1, wherein corner portions with respect to the arrangement direction of the pins for forming fiber holes of the spacer are formed as inclined surfaces or rounded surfaces.

* * * * *